United States Patent
Nishio et al.

(10) Patent No.: US 7,394,854 B2
(45) Date of Patent: Jul. 1, 2008

(54) SIGNAL TRANSMISSION SYSTEM

(75) Inventors: Toshiro Nishio, Hirakata (JP); Yutaka Nio, Osaka (JP)

(73) Assignee: Matsushita Electric Industrial Co., Ltd. (JP)

( * ) Notice: Subject to any disclaimer, the term of this patent is extended or adjusted under 35 U.S.C. 154(b) by 423 days.

(21) Appl. No.: 10/088,468

(22) PCT Filed: Jul. 23, 2001

(86) PCT No.: PCT/JP01/06340

§ 371 (c)(1),
(2), (4) Date: Jun. 11, 2002

(87) PCT Pub. No.: WO02/09444

PCT Pub. Date: Jan. 31, 2002

(65) Prior Publication Data

US 2002/0163970 A1    Nov. 7, 2002

(30) Foreign Application Priority Data

Jul. 21, 2000    (JP)    ............................. 2000-220751

(51) Int. Cl.
*H04N 7/12* (2006.01)
*H04N 11/02* (2006.01)
*H04N 11/04* (2006.01)
*H04B 1/66* (2006.01)

(52) U.S. Cl. ............................................... 375/240.25

(58) Field of Classification Search ..................
375/240.12–240.16, 240.25–240.27, 240.03,
375/240.02, 240.01, 240.29; 348/476, 564,
348/731; 382/275; 386/68; 710/52, 310; *H04N 7/12*
See application file for complete search history.

(56) References Cited

U.S. PATENT DOCUMENTS 4,849,808 A    7/1989    Rossi (Continued)

FOREIGN PATENT DOCUMENTS

CA    2314977    10/1999

(Continued)

OTHER PUBLICATIONS

DDWG Promoters, Digital Display Working Group, 1999, pp. 1-32.

(Continued)

*Primary Examiner*—Nhon Diep
(74) *Attorney, Agent, or Firm*—Marjama Muldoon Blasiak & Sullivan LLP

(57) ABSTRACT

A signal transmission system: that includes a signal transmission unit (101) that includes a MPEG decoder (102), which receives digital broadcasting and outputs a luminance signal Y and two color difference signals $P_B/P_R$, and a transmission path encoding circuit (103), which encodes the $YP_BP_R$ outputted from the MPEG decoder (102) into signals in the forms suited to a transmission path and transmits the encoded signals; and a signal reception unit (104) that includes a transmission path decoding circuit (105), which receives the encoded $YP_BP_R$ and decodes them, a Y processing circuit (106), which processes the decoded luminance signal Y, a chrominance processing circuit (107), which processes the respective decoded color difference signals $P_B/P_R$, a signal conversion circuit (108), which converts the $YP_BP_R$ outputted from the Y processing circuit (106) and the chrominance processing circuit (107) into RGB signals, and a display device (108) which displays the RGB signals.

14 Claims, 14 Drawing Sheets

U.S. PATENT DOCUMENTS

| | | | |
|---|---|---|---|
| 5,067,010 | A | 11/1991 | Ishii et al. |
| 5,245,423 | A | 9/1993 | Bernard |
| 5,257,106 | A * | 10/1993 | Maruoka ................... 348/731 |
| 5,402,177 | A * | 3/1995 | Maeshima et al. .......... 348/476 |
| 5,532,746 | A * | 7/1996 | Chang ................... 375/240.12 |
| 5,612,748 | A | 3/1997 | Gohshi et al. |
| 5,686,872 | A * | 11/1997 | Fried et al. ................ 333/22 R |
| 5,727,191 | A | 3/1998 | Konishi et al. |
| 5,790,204 | A * | 8/1998 | Yamaguchi ................. 348/564 |
| 5,909,254 | A | 6/1999 | Feig et al. |
| 5,969,767 | A * | 10/1999 | Ishikawa et al. ............ 348/564 |
| 5,987,554 | A * | 11/1999 | Liu et al. .................... 710/310 |
| 5,990,957 | A * | 11/1999 | Ryoo ..................... 375/240.03 |
| 6,310,921 | B1 | 10/2001 | Yoshioka et al. |
| 6,434,275 | B1 * | 8/2002 | Fukuda et al. .............. 382/275 |
| 6,560,282 | B2 * | 5/2003 | Tahara et al. ........... 375/240.02 |
| 6,583,793 | B1 * | 6/2003 | Gould et al. ................ 345/679 |
| 2002/0001346 | A1 * | 1/2002 | Kato et al. ............ 375/240.16 |
| 2002/0061184 | A1 * | 5/2002 | Miyamoto ................... 386/68 |

FOREIGN PATENT DOCUMENTS

| | | |
|---|---|---|
| EP | 0 581 715 A1 | 2/1994 |
| EP | 0 766 469 A2 | 4/1997 |
| EP | 0 896 318 A2 | 2/1999 |
| JP | 1-261989 | 10/1989 |
| JP | 6-105337 | 4/1994 |
| JP | 9-93505 | 4/1997 |
| JP | 10-341422 | 12/1998 |
| JP | 11187034 | 7/1999 |
| JP | 11187034 A | 7/1999 |
| JP | 2000-20304 | 1/2000 |
| WO | 00/22817 | 4/2000 |

OTHER PUBLICATIONS

Integrated Circuits, Data Sheet XP-002270546, Philips Semiconductors, OM5721 STB5660 (Set-Top Box) STB concept, May 5, 199, pp. 1-20.

Application Note, Hybrid Analogue/DVB TV Receiver IFA1999 Demonstrator AN99061, Philips Semiconductors, XP-002270547, pp. 1-78.

PC 99 System Design Guide, A Technical Reference for Designing PCs and Peripherals for the Microsoft Windows Family of Operating Systems, Intel Corporation and Microsoft Corporation, XP-002280085 © 1998 Intel Corporation and Microsoft Corporation, pp. 72-74, 274-280, 295-303.

VESA *Video Electronics Standards Association*, VESA Enhanced Extended Display Identification Data Standard, Release A, Revision 1, Feb. 9, 2000.

VESA Video Electronics Standards Association, VESA Plug and Display (P&D™) Standard, Version 1, Jun. 11, 1997, pp. 1-109.

Digital Display Working Group, Digital Visual Interface DVI Specification, Revision 1.0, Apr. 2, 1999, XP002907715 (76 pgs.).

* cited by examiner normally expected output ⇔ when TV setting is "Normal"

address 0x01

| displayable rate | code(binary) |
|---|---|
| 480i, 29.97Hz | 0000 |
| 480p, 29.97Hz | 0001 |
| 720p, 60Hz | 0010 |
| 1080i, 30Hz | 0011 |
| 1080p, 60Hz | 0100 |
| ⋮ | ⋮ | address 0x02

| the number of outputtable CH | code(hexadecimal) |
|---|---|
| 1CH | 0000 |
| 2CH | 0001 |
| 3CH(L/R/C) | 0002 |
| 4CH(L/R/SL/SR) | 0003 |
| 4CH(L/R/C/W) | 0004 |
| 5CH(L/R/SL/SR/C) | 0005 |
| 6CH(5.1ch full) | 0006 |

SIGNAL TRANSMISSION SYSTEM

TECHNICAL FIELD

The present invention relates to a signal transmission system for transmitting picture signals and, more particularly, to a signal transmission system in which hardware configurations of the video signal transmitting end and receiving end can be simplified.

BACKGROUND ART

A prior art example will be described with reference to FIG. 17. FIG. 17 is a block diagram illustrating the configuration of a conventional signal transmission system.

In FIG. 17, reference numeral 1701 denotes a video signal output unit (transmitting end) such as a STB (Set-top box), which outputs a video signal. Numeral 1702 denotes an MPEG decoder, which receives digital broadcasting and outputs baseband Y color-difference signals. Numeral 1703 denotes a signal conversion circuit, which converts the Y color-difference signals into RGB signals. Numeral 1704 denotes a transmission path encoding circuit, which encodes the signals converted by the signal conversion circuit 1703 into signals in formats suited to the transmission path. Numeral 1705 denotes a display unit (receiving end) such as a TV monitor. Numeral 1706 denotes a transmission path decoding circuit, which decodes the signals encoded by the transmission path encoding circuit 1704. Numeral 1707 denotes a signal conversion circuit, which converts the RGB signals outputted from the transmission path decoding circuit 1706 into $YP_BP_R$ signals. Numeral 1708 denotes a Y processing circuit, which processes luminance signals Y out of the output from the signal conversion circuit 1707. Numeral 1709 denotes a chrominance processing circuit, which processes chrominance signals out of the output from the signal conversion circuit 1707. Numeral 1710 denotes a signal conversion circuit, which receives the outputs from the Y processing circuit 1708 and the chrominance processing circuit 1709 and converts the Y color-difference signals into the RGB signals. Numeral 1711 denotes a display device, which receives the output from the signal conversion circuit 1710 and outputs it to a LCD or CRT.

An operation of the so-configured signal transmission system will be described.

The MPEG decoder 1702 receives digital broadcasting and outputs baseband video signals. As the data format of the MPEG is based on Y color-difference signals, the output here is $YP_BP_R$, or YUV, or $YC_bC_r$. Further, this signal must be converted into RGB signals to encode it adaptively to a transmission path, and thus the Y color-difference signals are converted into RGB signals by the signal conversion circuit 1703. The converted RGB signals are encoded into signal forms suited to the transmission path by the transmission path encoding circuit 1704.

On the other hand, on the TV monitor 1705 side, the transmission path decoding circuit 1706 receives the signals encoded by the transmission path encoding circuit 1704 and generates the original RGB signals. The RGB signals are converted into the $YP_BP_R$ of the Y color-difference signals by the signal conversion circuit 1707. Here, to perform independent processing on the TV monitor 1705 side, the Y signals are processed by the Y processing circuit 1708, and the chrominance signals $P_BP_R$ are enhanced by the chrominance processing circuit 1709, respectively, and these signals are outputted. The enhanced and outputted Y color-difference signals are converted into the RGB signals by the signal conversion circuit 1710 so as to be outputted to the final display device 1711. The display device 1711 outputs the RGB signals which have been outputted from the signal conversion circuit 1710, thereby to perform display.

However, in the above-described conventional signal transmission system, since the transmission path encoding is performed on the RGB signals, the output from the MPEG decoder is once converted into the RGB signals, encoded, and transmitted through the transmission path and, thereafter, the RGB signals must be converted into the $YP_BP_R$ to perform signal processing again on the monitor side and, further, the Y color-difference signals must be converted into the RGB signals once again to output the RGB signals to the final display device, resulting in a drawback of requiring a lot of hardware.

The present invention is made to solve the above-mentioned problems and has for its object to provide a signal transmission system in which hardware configurations of the video signal transmitting end and receiving end can be simplified

DISCLOSURE OF THE INVENTION

According to one embodiment of the present invention, there is provided a signal transmission system for transmitting a video signal, comprising: a signal transmission unit including; a decoder which receives digital broadcasting and outputs a luminance signal and two color difference signals, and an encoding circuit which encodes the luminance signal and the respective color difference signals into signal forms suited to a transmission path, and transmits the encoded signals; and a signal reception unit including; a decoding circuit which receives the encoded luminance signal and respective color difference signals, and decodes these signals, a luminance signal processing circuit which processes the decoded luminance signal, a color difference signal processing circuit which processes the respective decoded color difference signals, and a signal conversion circuit which converts the luminance signal outputted from the luminance signal processing circuit and the respective color difference signals outputted from the color difference signal processing circuit into RGB signals.

Therefore, it is possible to realize a signal transmission system in which hardware configurations at the video signal transmitting end and receiving end can he simplified.

According to a second embodiment of the present invention, there is provided a signal transmission system for transmitting a video signal through a transmission path, comprising: a signal transmission unit including; a decoder which receives digital broadcasting and outputs a luminance signal and two color difference signals, a time division multiplexing circuit which sub-samples the two color difference signals to signals with half pixel rates, subjects the signals to time division multiplexing, and outputs a multiplexed signal, and an encoding circuit which encodes the luminance signal and the multiplexed signal into signal forms suited to a transmission path, and transmits the encoded signals; and a signal reception unit including; a decoding circuit which receives the encoded luminance signal and multiplexed signal, and decodes these signals, a demultiplexing circuit which demultiplexes the decoded multiplexed signal into the original two color difference signals, a luminance signal processing circuit which processes the decoded luminance signal, a color difference signal processing circuit which processes the respective color difference signals demultiplexed, and a signal conversion circuit which converts the luminance signal outputted from the luminance signal processing circuit and the respective color difference signals outputted from the color difference signal processing circuit into RGB signals.

Since two color difference signals are multiplexed and transmitted, only two transmission paths are required while three transmission paths are required in the conventional system, resulting in a signal transmission system in which hardware configurations at the video signal transmitting end and receiving end can be simplified.

According to a third embodiment of the present invention, there is provided a signal transmission system for transmitting a video signal and an audio signal, comprising: a signal transmission unit including; an MPEG decoder which receives digital broadcasting and outputs the video/audio signal, an output interface which outputs the video/sound signal that has been outputted from the MPEG decoder, an I2C controller which outputs an I2C (Inter IC control) signal, a CPU which controls the whole unit, and a program ROM which stores an operation program of the CPU; and a signal reception unit including; an input interface which receives the video/audio signal from the signal transmission unit, a device interface which converts the video/audio signal into a video image and a sound, a video/audio output device which outputs the video image and the sound outputted from the device interface, to the outside, and an I2C controller which has a ROM table in which information relating to performance of the signal reception unit is stored, receives an I2C signal from the signal transmission unit, and outputs the information stored in the ROM table to the signal transmission unit according to a request from the signal transmission unit.

Therefore, the signal transmission unit can be previously informed of the performance of the signal reception unit, and signal transmission can be performed on the basis of the performance of the signal reception unit without transmitting a signal at a rate which cannot be scanned on the signal reception unit side as in the conventional system, thereby avoiding such a problem that no video image is displayed or no sound is outputted at the signal reception side.

According to a fourth embodiment of the present invention, in the signal transmission system as defined in embodiment 3, the ROM table stores information relating to resolution of a video image that can be outputted from the video/audio output device.

Therefore, the signal transmission unit can be previously informed of the resolution of a video image that can be outputted from the signal reception unit, thereby realizing a signal transmission system which can avoid such a problem that no video image is displayed.

According to a fifth embodiment of the present invention, in the signal transmission system as defined in embodiment 3, the ROM table stores information relating to the number of channels of audio that can be outputted from the video/audio output device.

Therefore, the signal transmission unit can be previously informed of the number of channels of audio that can be outputted from the signal reception unit, thereby realizing a signal transmission system which can avoid such a problem that no sound is outputted.

According to a sixth embodiment of the present invention, in the signal transmission system as defined in embodiment 3, the ROM table stores information relating to a signal conversion method for converting the luminance signal and color difference signals into RGB signals.

Therefore, the signal transmission unit can be previously informed of a signal conversion method to be performed at the signal reception unit side, thereby realizing a signal transmission system which can perform signal conversion correctly.

According to a seventh embodiment of the present invention, in the signal transmission system as defined in embodiment 3, the ROM table stores information relating to gamma control of the video signal.

Therefore, the signal transmission unit can be previously informed of gamma control of a video signal at the signal receiving end, whereby the transmission unit can output a non-enhanced video signal to the signal reception unit.

According to an eighth embodiment of the present invention, in the signal transmission system as defined in embodiment 3, the ROM table stores information relating to whether or not the signal reception unit has a mode in which a video image is not subjected to enhancement processing.

Therefore, when the signal reception unit has a mode in which no enhancement processing is performed, the signal transmission unit can forcibly switch the reception unit to that mode, whereby the signal reception unit can display a video image which is not enhanced in color.

According to a ninth embodiment of the present invention, in the signal transmission system as defined in embodiment 3, the ROM table stores information relating to a maker code and a device code of the signal reception unit.

Therefore, the signal transmission unit can be previously informed of the maker code and device code of the signal reception unit, and when up-conversion of a picture is carried out, the respective performances of the signal transmission unit and the signal reception unit are compared, and either of these units having better performance can be automatically selected.

According to a tenth embodiment of the present invention, in the signal transmission system as defined in embodiment 3, the signal reception unit outputs the kind of aspect conversion processing that is currently performed to output a video image, to the signal transmission unit through the I2C controller.

Therefore, the signal transmission unit can transmit a video signal so that the signal reception unit can obtain a correct aspect.

According to an eleventh embodiment of the present invention, in the signal transmission system as defined in embodiment 3, the signal transmission unit includes a selector which multiplexes control information in a vertical retrace period of the video signal and outputs it, said control information indicating whether a video frame signal, that is currently outputted from the MPEG decoder separately from the video/audio signal, is generated by being repeatedly outputted in the MPEG decoder or not; and the signal reception unit includes a control information separation unit which separates the control information from the video signal, and a picture quality control unit which subjects the video signal to an adaptive signal processing according to the control information, and outputs the video signal to the device interface.

Therefore, the signal reception unit can be operated on the basis of the control information comprising minimum requirements such as brightness, contrast, volume, and the like.

According to a twelfth embodiment of the present invention, in the signal transmission system as defined in embodiment 11, the control information is information indicating a picture encoding method based on the MPEG standard, by which I, P, and B pictures can be discriminated from each other.

Therefore, it is possible to realize a signal transmission system which can set parameters for noise removal for every frame.

According to a thirteenth embodiment of the present invention, in the signal transmission system as defined in embodiment 11, the control information is compression ratio information based on the MPEG standard.

Therefore, it is possible to realize a signal transmission system which can set parameters for noise removal for every frame.

According to a fourteenth embodiment of the present invention, in the signal transmission system as defined in embodiment 11, the control information is information indicating whether a material before being MPEG-encoded is picked up by progressive scanning or interlaced scanning.

Therefore, the signal reception unit can select a method of conversion from interlacing to progressive.

BEST MODE TO EXECUTE THE INVENTION

Hereinafter, embodiments of the present invention will be described with reference to the drawings. The embodiments described here are merely examples and the present invention is not restricted to these embodiments.

EMBODIMENT 1

Hereinafter, a signal transmission system according to a first embodiment of the present invention will be described with reference to FIG. 1.

Figure 1:
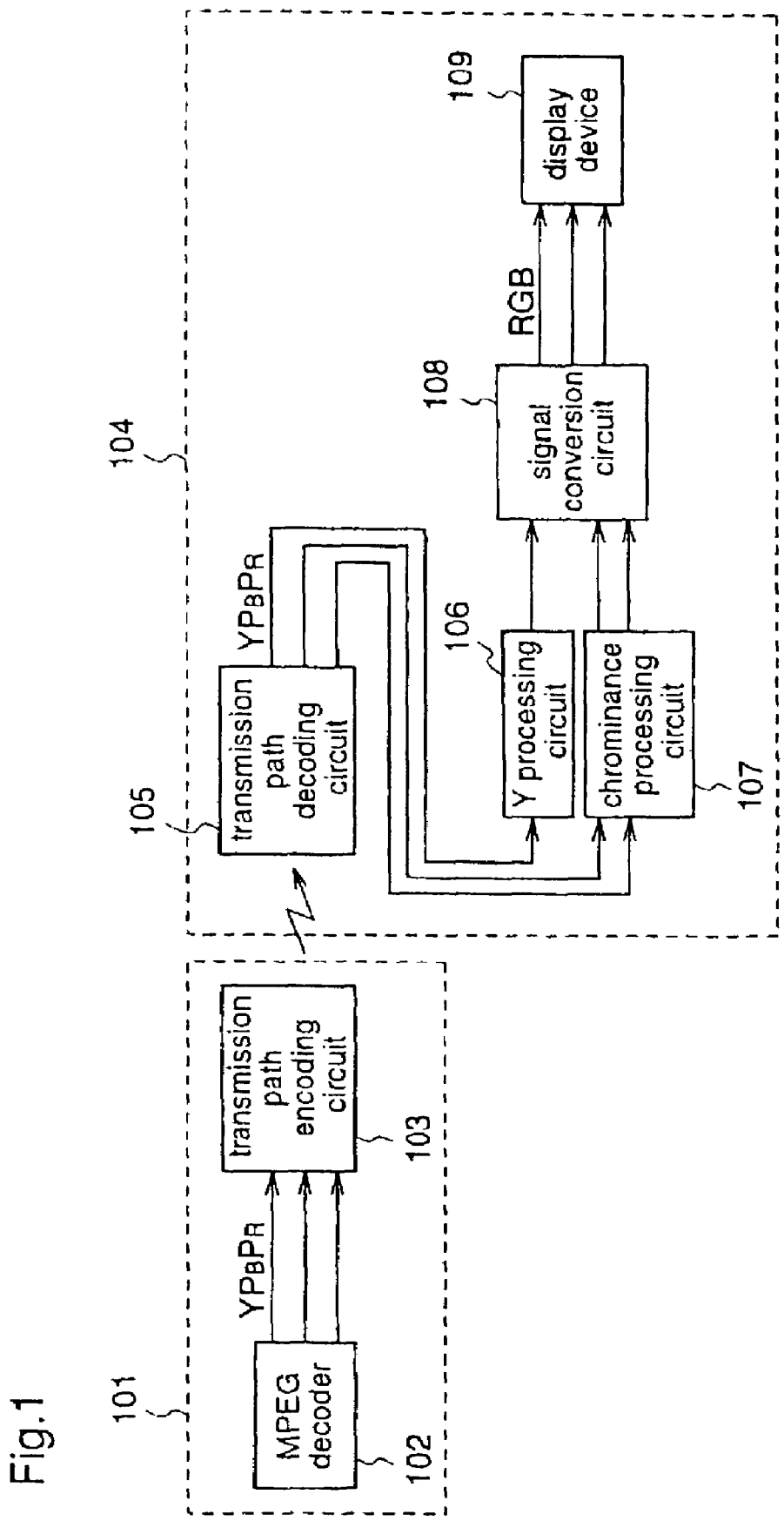
FIG. 1 is a block diagram illustrating the configuration of a signal transmission system according to a first embodiment.

FIG. 1 is a block diagram illustrating the configuration of the signal transmission system according to the first embodiment of the present invention.

In FIG. 1, numeral 101 denotes a video signal output unit such as a STB, which outputs a video signal Numeral 102 denotes an MPEG decoder, which receives digital broadcasting or the like and outputs a luminance signal and two color-difference signals. Numeral 103 denotes a transmission path encoding circuit, which encodes the luminance signal and the color-difference signals outputted from the MPEG decoder 102 into signals in the forms suited to a transmission path/ and transmits these signals. Numeral 104 denotes a display unit such as a TV monitor, which displays the video signal. Numeral 105 denotes a transmission path decoding circuit, which receives the luminance signal and the color difference signals encoded by the transmission path encoding circuit 103, and decodes these signals. Numeral 106 denotes a Y processing circuit, which processes the decoded luminance signal that has been outputted from the transmission path decoding circuit 105. Numeral 107 denotes a chrominance processing circuit, which processes chrominance signals out of the signals outputted from the transmission path decoding circuit 105. Numeral 108 denotes a signal conversion circuit, which converts the Y color-difference signals that have been outputted from the Y processing circuit 106 and the chrominance processing circuit 107 into RGB signals. Numeral 109 denotes a display device, which receives the output from the signal conversion circuit 108 and displays it.

The operation of the so-configured signal transmission system will be described.

The MPEG decoder 102 receives a broadcast wave of digital broadcasting and outputs baseband $YP_BP_R$ signals in conformity with the MPEG standard. Since, in the conventional signal transmission system, not the Y color-difference signals but the RGB signals are encoded and transmitted, the $YP_BP_R$ signals outputted from the MPEG decoder are converted into the RGB signals. In the signal transmission system according to the first embodiment, however, the $YP_BP_R$ signals are inputted, as they are, to the transmission path encoding circuit 103 which performs encoding suited to the transmission path. The transmission path encoding circuit 103 encodes the inputted $YP_BP_R$ signals into signals in the forms suited to the transmission path and outputs the encoded signals to the transmission path.

The transmission path decoding circuit 105 decodes the encoded signals which have been received through the transmission path, into the original $YP_BP_R$ signals, and outputs the decoded $YP_BP_R$ signals. Among the outputs from the transmission path decoding circuit 105, the Y signal as the luminance signal is inputted to the Y processing circuit 106 and subjected to various signal processings such as adjustment of luminance contrast. Further, among the outputs from the transmission path decoding circuit 105, the chrominance signals of $P_B$ and $P_R$ are subjected to required processings by the chrominance processing circuit 107, respectively. The signal conversion circuit 108 converts the processed Y signal and chrominance signals which are outputted from the Y processing circuit 106 and the chrominance processing circuit 107 into the RGB signals, and outputs them to the display device 109 The display device 109 receives the RGB signals outputted from the signal conversion circuit 108 and displays them.

In this signal transmission system according to the first embodiment, the Y color-difference signals outputted from the MPEG decoder 102 are encoded and transmitted as they are, whereby a circuit for converting the Y color-difference signals into the RGB signals can be dispensed with at the video signal output unit 101 side (transmitting end). Further, at the display unit 104 side (receiving end), the Y color-difference signals are inputted as they are, whereby a circuit for converting the RGB signals into the Y color-difference signals can be dispensed with, resulting in simplified hardware configuration.

EMBODIMENT 2

Hereinafter, a signal transmission system according to a second embodiment of the present invention will be described with reference to FIG. 2.

Figure 2:
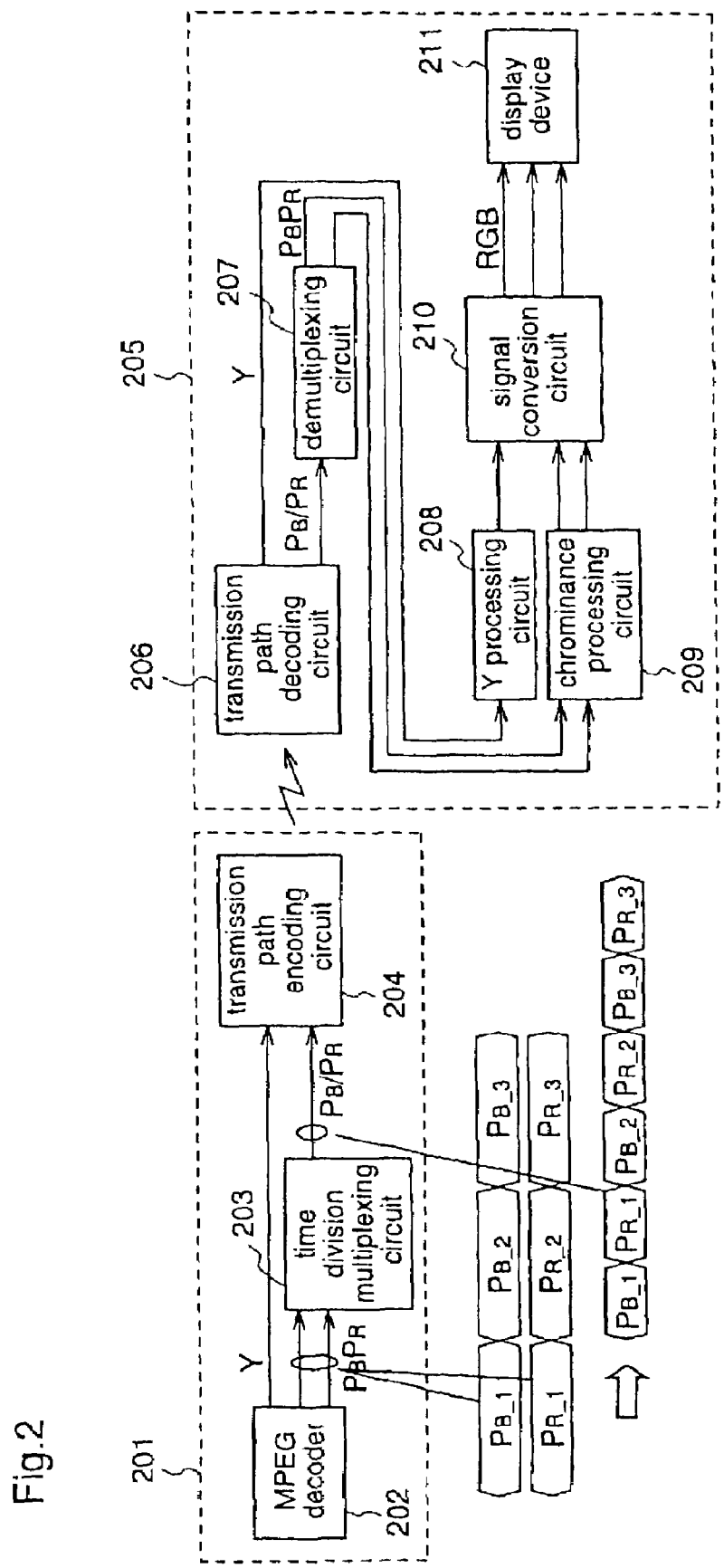
FIG. 2 is a block diagram illustrating the configuration of a signal transmission system according to a second embodiment

FIG. 2 is a block diagram illustrating the configuration of the signal transmission system according to the second embodiment of the present invention.

In FIG. 2, numeral 201 denotes a video signal output unit such as a STB, which outputs a video signal. Numeral 202 denotes an MPEG decoder, which receives digital broadcasting or the like and outputs a luminance signal and two color-difference signals. Numeral 203 denotes a time division multiplexing circuit, which time-division-multiplexes color difference signals $P_B$ and $P_R$ that have been outputted from the MPEG decoder 202 and converts them into a single signal line. Numeral 204 denotes a transmission path encoding circuit, which encodes the Y signal outputted from the MPEG decoder 202 and the multiplexed $P_B P_R$ signal outputted from the time division multiplexing circuit 203 into signals in the forms suited to the transmission path, and transmits these signals. Numeral 205 denotes a display unit such as a TV monitor, which displays the video signal. Numeral 206 denotes a transmission path decoding circuit, which decodes the signals that have been encoded so as to suit the transmission path, into the original Y signal and multiplexed $P_B P_R$ signal, and outputs these signals. Numeral 207 denotes a demultiplexing circuit, which demultiplexes the multiplexed $P_B P_R$ signal into the original $P_B$ signal and $P_R$ signal. Numeral 208 denotes a Y processing circuit, which processes the Y signal outputted from the transmission path decoding circuit 206. Numeral 209 denotes a chrominance processing circuit, which processes the demultiplexed $P_B$ signal and $P_R$ signal. Numeral 210 denotes a signal conversion circuit, which converts the inputted $YP_B P_R$ signals into RGB signals. Numeral 211 denotes a display device, which displays the RGB signals outputted from the signal conversion circuit 210.

The operation of the so-configured signal transmission system will be described.

The MPEG decoder 202 receives a video signal, and decodes it to output three signal lines of $YPP_R$, i.e., a baseband Y signal and two color difference signals, to the time division multiplexing circuit 203. As the sampling frequency of the $P_B$ signal and the $P_R$ signal in the horizontal direction is one half of that of the Y signal, the time division multiplexing circuit 203 performs time-base multiplexing on the $P_B$ signal and the $P_R$ signal, arranges them alternately, and outputs them in a single line. The transmission path encoding circuit 204 subjects the multiplexed signal $P_B P_R$ and the Y signal outputted from the MPEG decoder 202 to encoding that is suited to the transmission path, and outputs them to the display unit 205 side.

The transmission path decoding circuit 206 decodes the signals received through the transmission path into the original luminance signal Y and multiplexed signal $P_B P_R$ and outputs them to the demultiplexing circuit 207. Since the $P_B P_R$ signal is time-base multiplexed, the demultiplexing circuit 207 returns the $P_B P_R$ signal into the original $P_B$ signal and $P_R$ signal. Then, the Y processing circuit 208 performs predetermined processing on the luminance signal Y, and the chrominance processing circuit 209 performs predetermined processing on the signals $P_B$ and $P_R$. The $YP_B R_R$ signals obtained in this way are converted into the RGB signals by the signal conversion circuit 210, and the RGB signals are inputted to the display device 211 and displayed.

Since thee signal transmission system according to the second embodiment is provided with the Lime division multiplexing circuit 203 which multiplexes the two chrominance signals and outputs them in a single signal line, only two transmission paths are required in this second embodiment while three transmission paths are required in the first embodiment.

EMBODIMENT 3

Hereinafter, a signal transmission system according to a third embodiment of the present invention will be described with reference to FIGS. 3 to 7.

Figure 3:
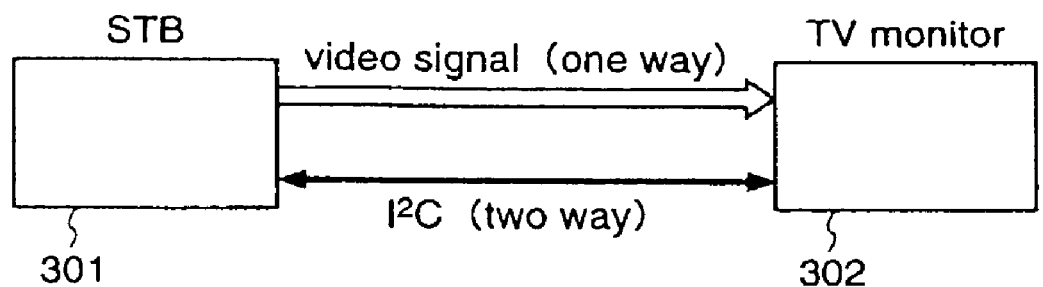
FIG. 3 is a schematic block diagram of a signal transmission system according to a third embodiment.

FIG. 3 is a block diagram schematically illustrating the configuration of the signal transmission system according to the third embodiment of the present invention.

In FIG. 3, numeral 301 denotes a STB for receiving digital broadcasting or the like, which outputs a video signal Numeral 302 denotes a TV monitor which displays the video signal received from the STB 301. It is assumed that $I^2C$ bidirectional communication is possible between the STB 301 and the TV monitor 302.

Figure 4:
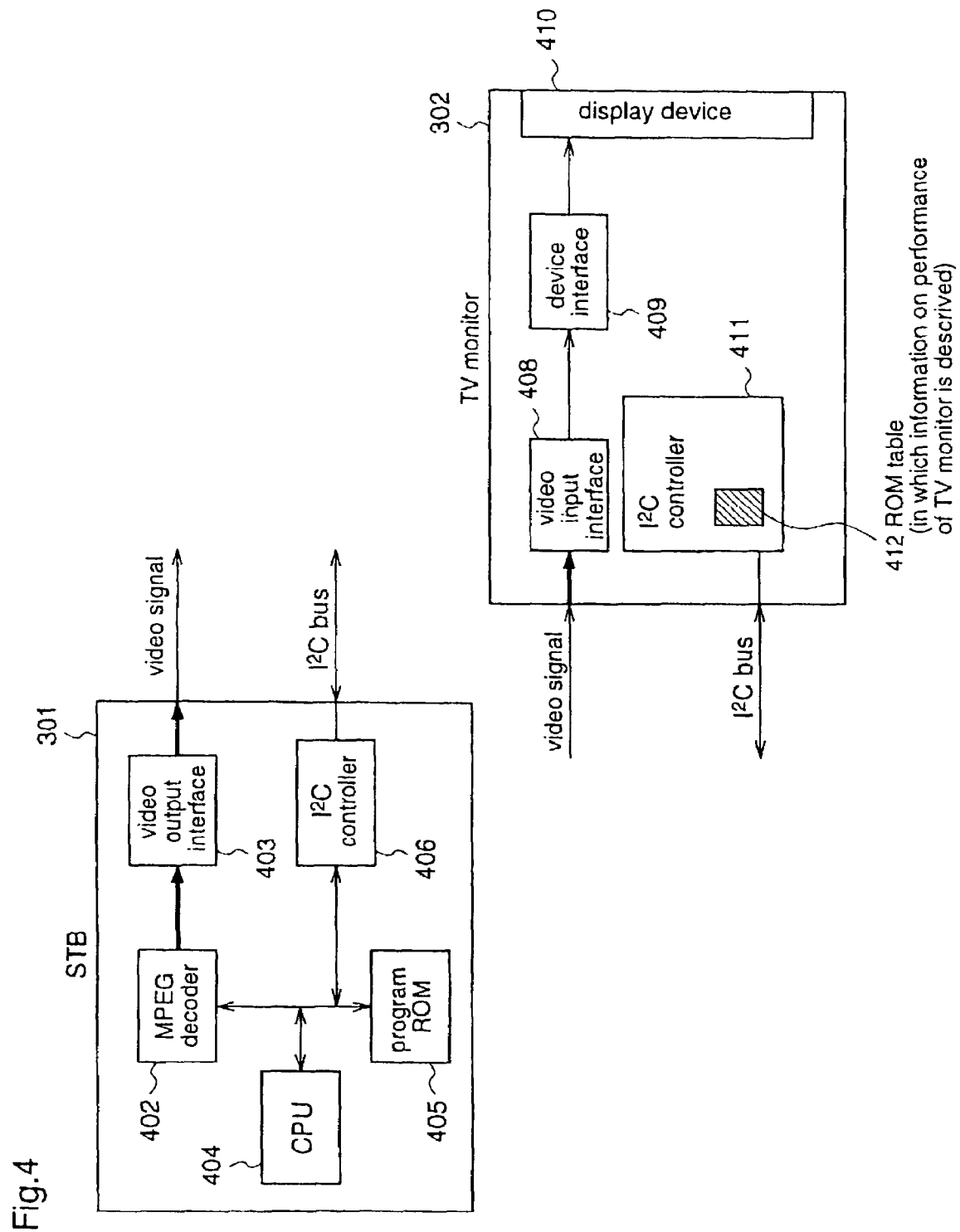
FIG. 4 is a block diagram illustrating a detailed configuration of the signal transmission system according to the third embodiment.

FIG. 4 is a block diagram for explaining the STB 301 and the TV monitor 302 in detail. In FIG. 4, the same or corresponding constituent elements as those shown in FIG. 3 are denoted by the same reference numerals, and their descriptions will be omitted.

In FIG. 4, numeral 402 denotes an MPEG decoder, which receives digital broadcasting or the like and outputs a baseband signal of a video image. Numeral 403 denotes a video output interface, which outputs the video signal that has been outputted from the MPEG decoder 402. Numeral 404 denotes a CPU, which is operated by a program ROM 405 and controls the MPEG decoder 402 and its periphery. Further, the CPU 404 can also control an $I^2C$ controller 406. Numeral 408 denotes a video input interface, to which the video signal received through a transmission path is inputted. Numeral 409 denotes a device interface, which converts the video signal into a signal suitable for a display device for displaying. Numeral 410 denotes a display device itself such as a LCD or a CRT. Numeral 411 denotes an $I^2C$ controller, which controls an $I^2C$ bus and has a ROM table 412 in which information relating to performance of the TV monitor 302 is stored. Further, the ROM table 412 includes information relating to resolution of a video image that can be outputted from the display device 410, information relating to the number of channels of audio that can be outputted from the display device 410, information relating to a signal conversion method for converting a luminance signal and color difference signals into RGB signals, information relating to gamma control of the video signal, information as to whether or not the TV monitor 302 has a mode in which the video image is not subjected to enhancement processing, and information relating to a maker code and a device code of the TV monitor 302. Further, the TV monitor 302 outputs the kind of aspect conversion processing which is presently performed to output the video image, to the STB 301 through the I2C controller 411.

Figure 5:
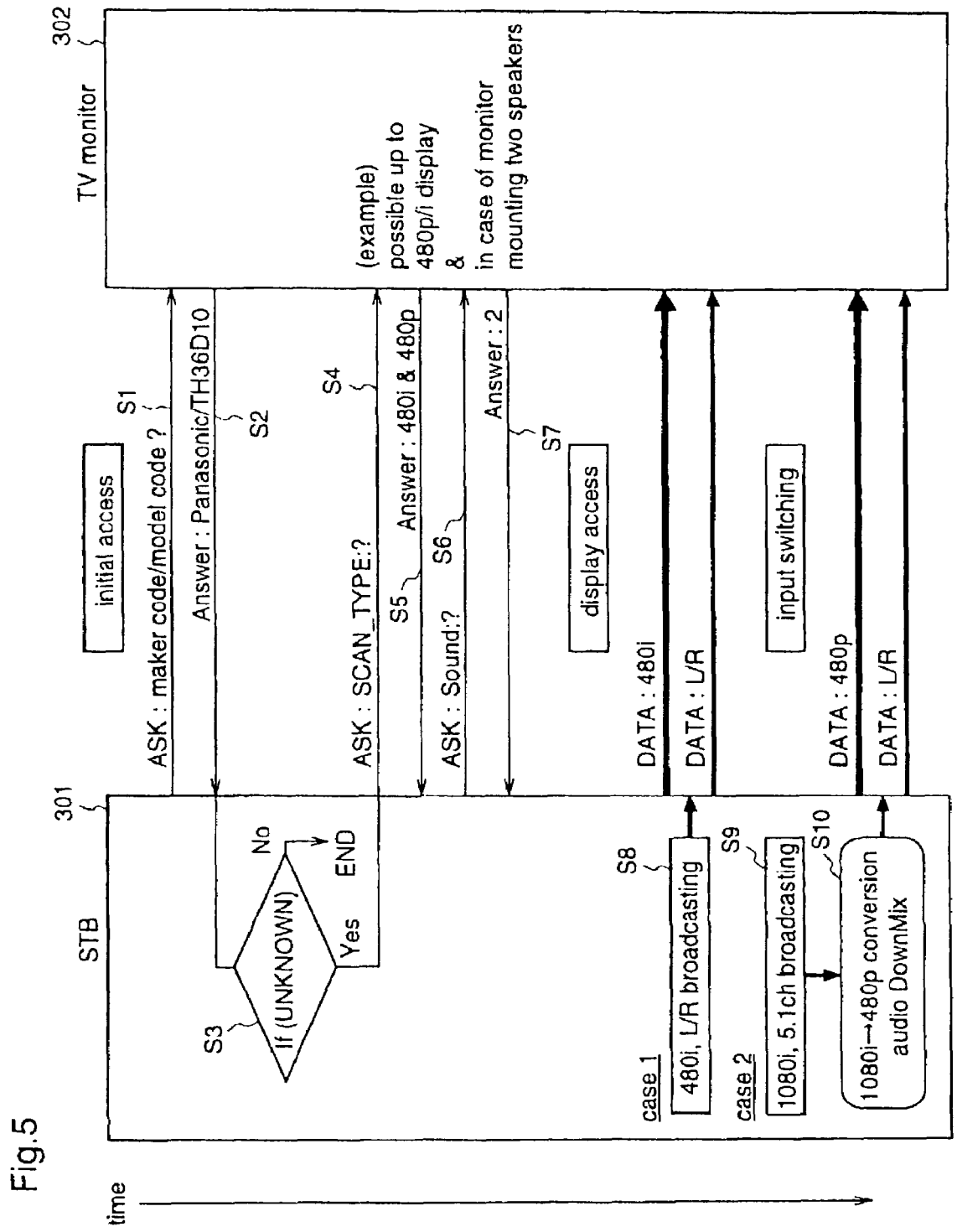
FIG. 5 is a diagram for explaining an initial protocol in the signal transmission system according to the third embodiment.

The operation of the so-configured signal transmission system will be described with reference to FIG. 5. Here, an initial protocol by the $I^4C$ will be described with reference to FIG. 5.

First of all, the STB 301 side asks the TV monitor 302 about the maker code and device code of the TV monitor 302

(S1). The TV monitor 302 answers the maker code and device code to the STB side 301 from the ROM table 412 (S2).

When the received maker code and device code have already been known, the STB 301 ends the protocol (S3). On the other hand, when the received maker code and device code are unknown, the STB 301 asks the TV monitor 302 about the scanning rate the TV monitor 302 copes with (S4). The TV monitor 302 answers the scanning rate at which it can perform scanning (S5).

Next, the STB 301 side asks the TV monitor 302 side what kind of audio the TV monitor 302 can reproduce (S6). The TV monitor 302 side answers the number of channels of audio the TV monitor 302 can output (S7). Thereby, the initial protocol between the STB 301 and the TV monitor 302 is ended.

Next, it is supposed, as case 1, that the STB 301 receives broadcasting having audio of 480i and 2-channel LR. In this case, by the negotiation of the previous initial access, the STB 301 knows that the TV monitor 302 can output 480i and 2-channel LR, and thus the audio of 480i and 2-channel LR is outputted to the TV monitor 302 side as it is, without being processed for display rate or sound.

When, as case 2, broadcasting of 1080i and 5.1-channel is received, since the STB 301 knows that the 1080i cannot be received by the connected TV monitor 302 by the negotiation of the initial protocol, the 1080i is converted into 480p on the STB 301 side. The conversion into 480p is performed because it is known by the previous negotiation that the TV monitor 302 can perform display at a display rate up to 480p. Further, it is also known that audio of 5.1 channel cannot be reproduced by the connected TV monitor, the 5.1 channel is downmixed to 2-channel LR on the STB 301 side. As the result, 480p is outputted as video data and downmixed 2-channel LR is outputted as audio data.

Figures 6, 7:
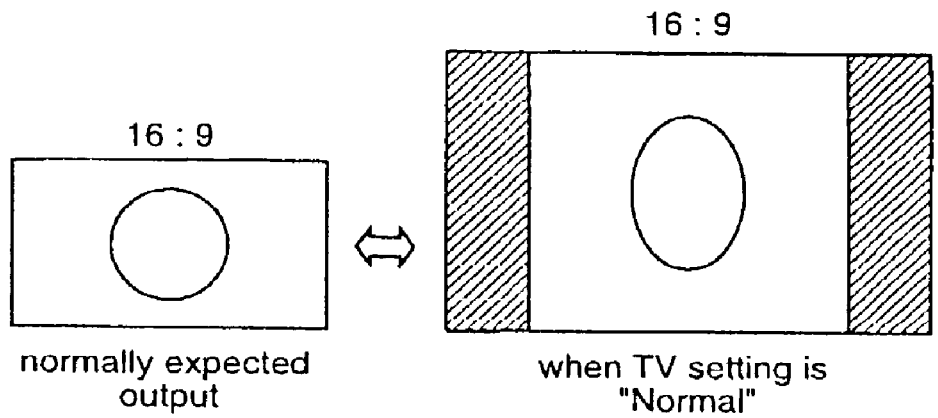
FIG. 6 is a diagram illustrating a state of screen display of a 16:9 wide material TV.
FIG. 7 is a diagram showing an example of a ROM table.
Figure 8:
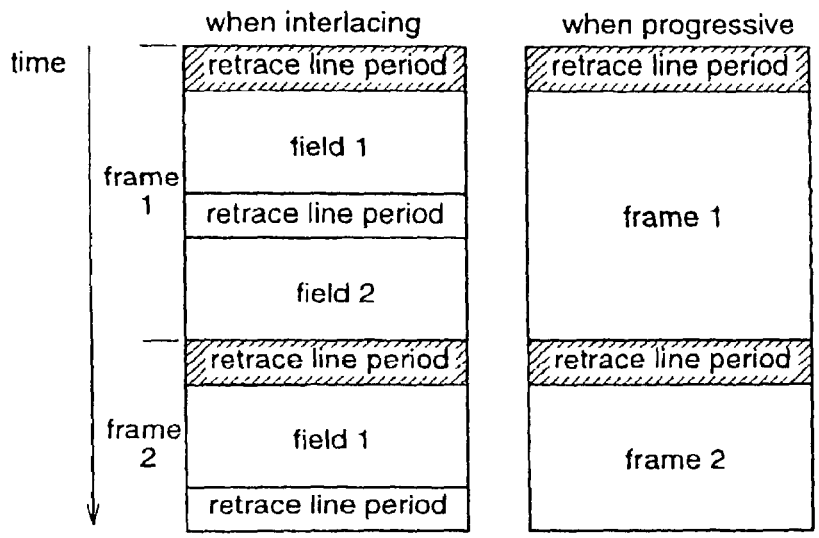
FIG. 8 is a diagram for explaining a retrace period in a case where an output video rate is interlacing and in a case where the output video rate is progressive, respectively.

Here, the ROM table 412 which is included in the I$^2$C controller 411 in the TV monitor 302 will be described with reference to FIG. 7. For example, 4 bits indicating a displayable rate are stored at address 01 and, for example, in the case of a TV monitor which can display a signal of 480i and 299.7 Hz, a value of 0000 is entered in the ROM table 412. Further, the number of channels of audio that can be outputted is stored at address 02 and, for example, a value of 0006 is entered when 6-channel decoding is possible. An address and a numeric value of such code are standardized in the industry. Thereby, even when the maker of the TV monitor is not known by the STB, since the minimum protocol is decided, it is possible to avoid the situation where no video image is displayed, a video image is displayed with an abnormal aspect, or no sound is outputted. That is, it is possible to avoid the problem that a video image cannot be displayed because the transmitting end transmits the video image with a frame rate at which the video image cannot be drawn-in at the PC monitor side or the TV monitor side, as in the conventional system.

As described above, in the signal transmission system according to the third embodiment, since the STB outputs a video signal with the knowledge of the performance of the TV monitor, it is possible to avoid a problem that no video image is displayed or no sound is outputted at the TV monitor side, by performing the above-described negotiation, while in the conventional system the STB might output a rate at which the TV monitor cannot perform scanning.

Further, when the TV monitor transmits its maker code and device code to the STB, if the maker code and device code fall in makers the information of which is disclosed between the STB and the TV monitor, it can be automatically selected, for example, whether an image should be up-converted by the STB or the TV monitor, by comparing performances of up-converting which are possessed by the STB and the TV monitor.

Further, the initial access has been described taking the case where the negotiation is performed only for the type of scanning and the number of channels of reproducible audio. However, as another example of initial access, when it is known that the connected TV monitor is either a 16:9 wide TV or a 4:3 normal TV, letter box conversion or pan scan conversion is automatically performed at the STB side, whereby a correct aspect can automatically obtained. Accordingly, there is no need to set the connected monitor as to whether it is a wide TV or a normal TV, in the initial menu on the STB side, as in the conventional system.

Further, generally, the TV monitor does not output a received signal as it is but enhances the signal with respect to the luminance and chrominance, and outputs it. However, there are cases where it is not desirable that a user of a personal computer manipulates the luminance and chrominance intentionally. In such cases, the characteristics of enhancement at the TV monitor side are notified to the STB side and the STB side outputs a video signal that is corrected inversely to the enhancement, whereby a non-enhanced video signal can be outputted to the TV monitor side in total.

Further, when the TV monitor side is provided with a mode in which no enhancement is performed, reproduction with no chrominance enhancement can be secured by forcibly switching the TV monitor to that mode from the STB side.

Further, when the connected monitor is a wide TV, there is generally display modes such as a wide mode and a normal mode on the TV side. For example, when a 16:9 monitor is connected and a material received by the STB is 16:9, the STB outputs the material as it is without performing aspect conversion. However, when the TV side is set at the normal display, what is actually circular might be displayed as longitudinal as shown on the right hand in FIG. 6. In this case, when the STB side sets the display mode of the TV side to a full display mode, a normal aspect image can be obtained In FIG. 6, a diagram on the left hand shows a 16:9 picture which is normally expected to be outputted, and a diagram on the right hand shows a picture of an erroneous aspect when the TV side is erroneously set to a normal mode.

Further, when signals to be transmitted between the STB and the TV monitor are not RGB signals but Y color-difference signals, i.e., YP$_B$P$_R$ signals, a conversion formula for converting the YP$_B$P$_R$ signals into the original RGB signals on the TV side may be different from that at the STB side and, therefore, the conversion formula itself can be also transmitted. As the conversion formula is described in MPEG stream data, the conversion formula extracted on the STB side is transmitted to the TV monitor side through the I$^2$C, whereby the YP$_B$P$_R$ signals can be converted into the normal RGB signals on the TV monitor side.

Figure 12:
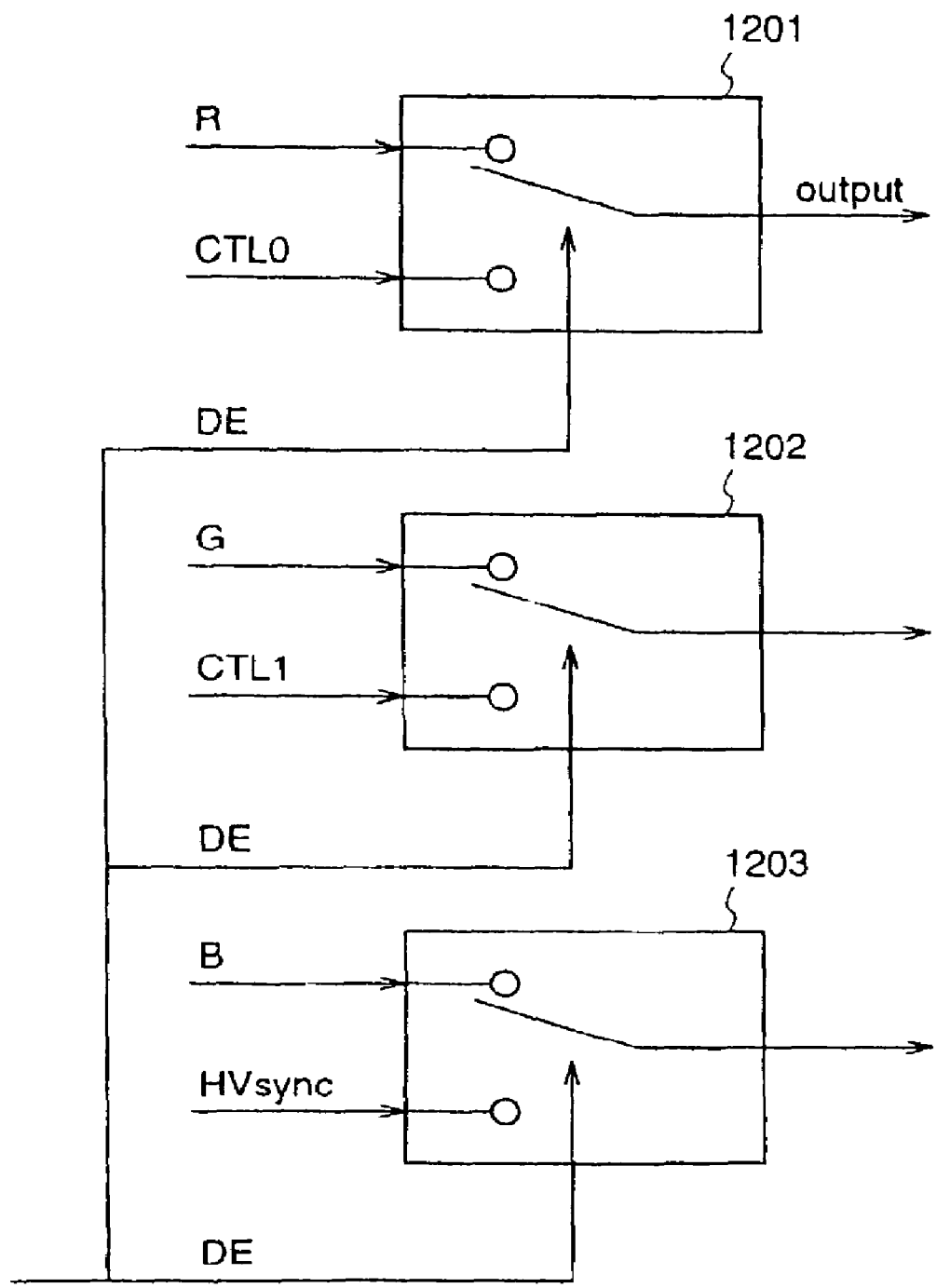
FIG. 12 is a diagram illustrating the composition of a selector in the signal transmission system according to the fourth embodiment.

Further, data transmission in the signal transmission system according to the third embodiment may be carried out such that data are multiplexed by employing a CTL0 or a CTL1 as a video signal line as shown in FIG. 12.

EMBODIMENT 4

Hereinafter, a signal transmission system according to a fourth embodiment of the present invention will be described with reference to FIGS. 8 to 16.

FIG. 12 is a diagram illustrating the configuration of a selector provided in a video output interface at the transmitting end in the signal transmission system according to the fourth embodiment of the present invention. A difference from the third embodiment is that the video output interface 403 includes the selector.

In FIG. 12, a selector 1201 temporally selects a red signal R and another control signal CTL0 by DE. A selector 1202 temporally selects a green signal G and a control signal CTL1. A selector 1203 temporally switches between a blue signal B and an HV sink signal. Here, the DE is a signal for discriminating between a scanning period and a retrace period of an image.

Figure 10:
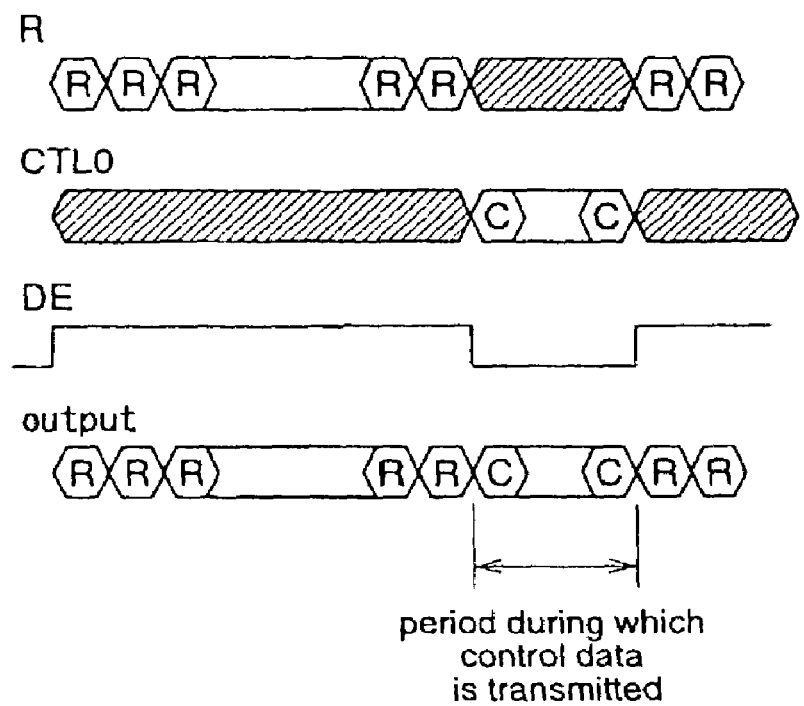
FIG. 10 is a diagram for explaining an operation of a selector.

FIG. 10 is a diagram for explaining the operation of the selector. While a description will be given of the selector 1201 here, the other selectors 1202 and 1203 are similarly operated and, therefore, descriptions thereof will be omitted. In FIG. 10, the DE signal becomes HIGH during the video period and becomes LOW during the retrace period.

As the R signal and the CTL0 signal are inputted, the selector 1201 is operated to pass the R signal through when the DE signal is HIGH, while it is operated to pass the CTL0 signal through when the DE signal is LOW. Therefore, the output signal is the R signal during the video signal period while it is the CTL0 signal during the retrace period, which means control data can be transmitted. When the video rate of the output is interlacing, the retrace period becomes as shown on the left hand in FIG. 8. When the video rate of the output is progressive, it becomes as shown on the right hand in FIG. 8.

Figure 9:
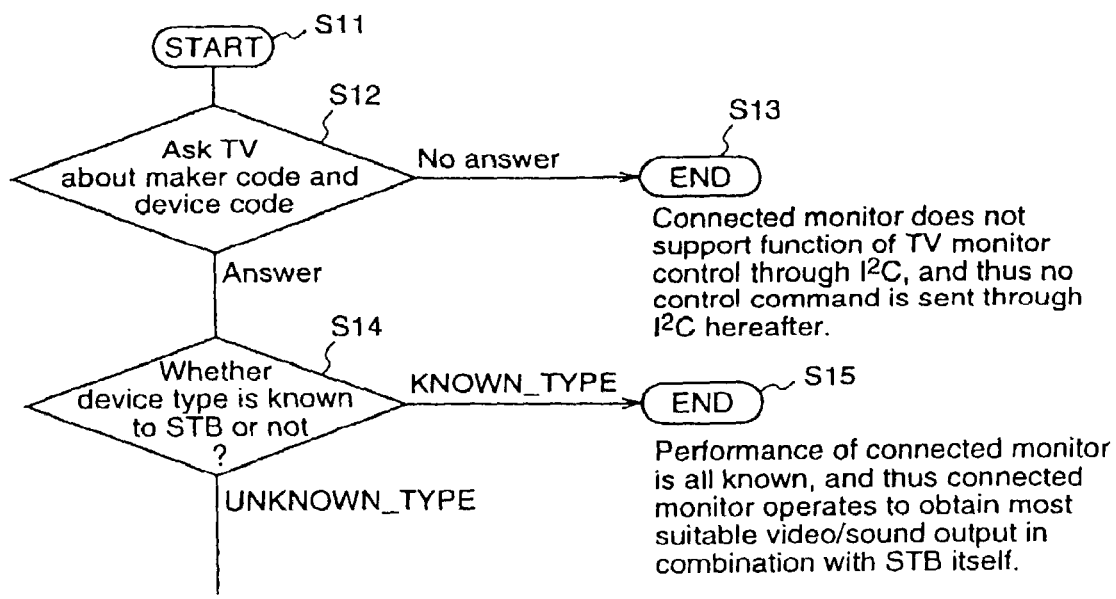
FIG. 9 is a flowchart for explaining an operation of a signal transmission system according to a fourth embodiment of the present invention.

The operation of the so-configured signal transmission system will be described with reference to FIG. 9.

First of all, the STB asks the TV side about its maker code and device code (S12). When the TV monitor side is a device which had been shipped before standardization, no answer is usually obtained for the asking about the maker code and the device code, and therefore, the processing is ended in this case, and the STB understands that the connected monitor does not support the function of TV monitor control through the I²C and decides that no control command will be sent through the I²C hereafter (S13).

On the other hand, when an answer is obtained for the asking about the maker code and device code, the STB checks whether or not the maker and device are of the types the STB has already known (S14). In the case where the maker and device are of the known types, the processing is ended, and the connected monitor operates so as to change the output of the most suitable video and audio in combination with the STB itself since the performance of the connected monitor is known to the STB side (S15). When it is judged in S14 that the maker and device are of unknown types (UNKNOWN_TYPE), the rate at which display is possible and the number of audio channels are sequentially confirmed. Industrial standards should be created in advance for basic adjustment functions of adjusting volume, mute, brightness, contrast, etc., and the STB judges that these functions can be used.

Figure 11:
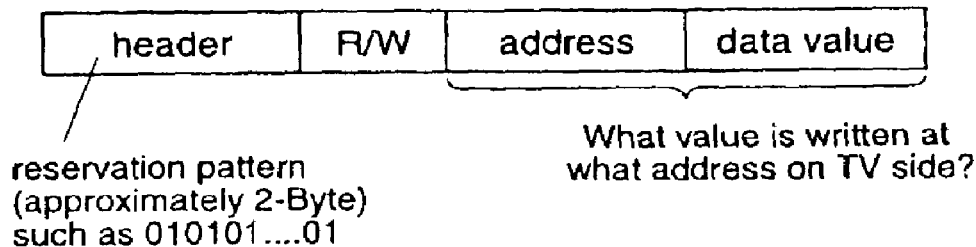
FIG. 11 is a diagram showing an example of the constitution of control data.

FIG. 11 shows an example of a construction of control data. For example, a piece of control data is composed of a header as a reservation pattern in which, for example, 01 continues for a 2-byte period, several bytes of R/W data for discriminating between writing from the STB to the TV and reading for reading the state on the TV side, an address on the TV side in which some value is written, and a value of the data to be written or read. As the control data is constituted as described above, a desired command can be sent to the TV side.

Figure 13:
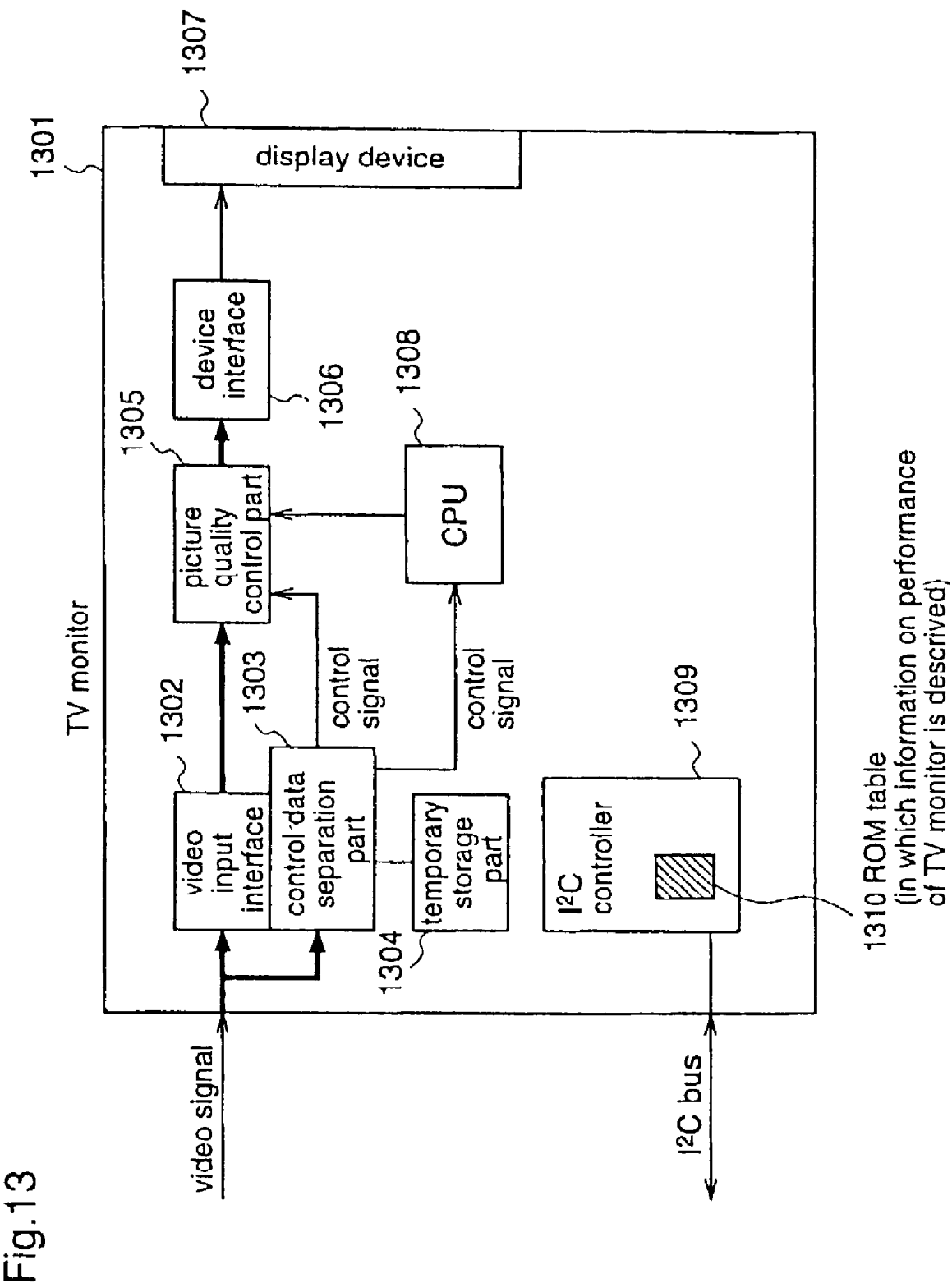
FIG. 13 is a block diagram illustrating the configuration of the receiving end of the signal transmission system according to the fourth embodiment.

FIG. 13 is a block diagram illustrating the configuration of the receiving end, that is, the TV monitor.

In FIG. 13, numeral 1301 denotes a receiving TV monitor itself. Numeral 1302 denotes a video input interface, to which a video signal received thorough a transmission path is inputted. Numeral 1303 denotes a control data separation part, which separates only control data out of the video signal. Numeral 1304 denotes a temporary storage part, which temporarily stores the control data. Numeral 1305 denotes a picture quality control part, which corrects picture quality of the vide signal. Numeral 1306 denotes a device interface, which is an interface for a display device 1307. Numeral 1308 denotes a CPU, which is used to control the picture quality control part 1305 with respect to a control signal from the control data separation part 1303, which requires no real time property. Numeral 1309 denotes an I₂C controller, which controls an I₂C bus. Numeral 1310 denotes a ROM table in the I₂C controller 1309, where performance of the TV monitor 1301 is described. On the assumption that basic commands such as brightness, contrast, volume, and the like are standardized in the industry, such control data is interpreted by the CPU 1308, and the CPU 1308 control's the picture quality control part 1305.

Since data attached to each frame is desired to be inputted to the picture quality control part 1305 without intervention of the CPU 1308, the control signal to the picture quality control part 1305 is also outputted from the control data separation part 1303 directly. As an example of a control signal, there is information indicating that a decoded picture is any of I picture, P picture, and B picture, or whether a material of each frame is picked up by progressive scanning or interlaced scanning, or the like.

As the receiving end is configured as described above, the TV monitor side can be operated with the minimum requirements such as brightness, contrast, and volume, which are control data from the STB. Further, as the STB transmits the control signal for each frame, it can control the picture quality for each frame.

Figure 14:
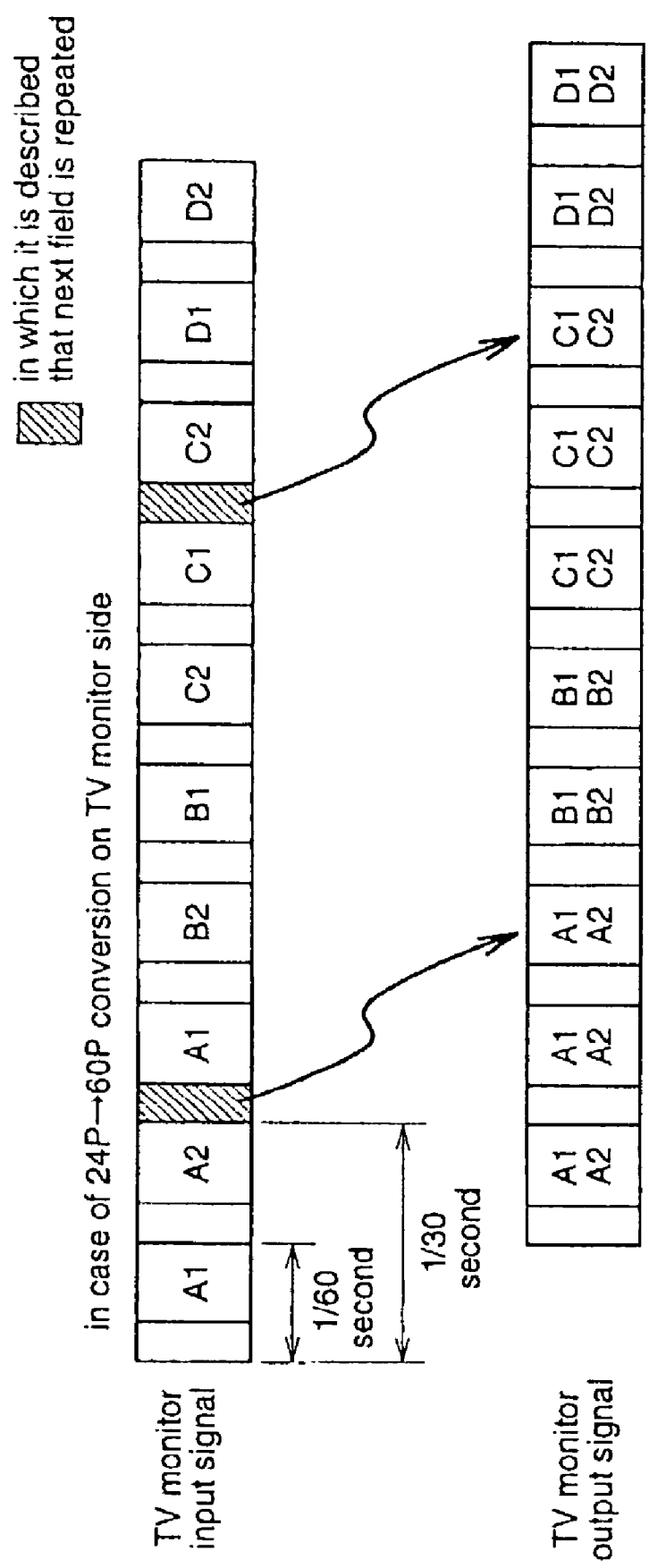
FIG. 14 is a diagram showing an example of a control signal transmitted for each frame in the signal transmission system according to the fourth embodiment.

FIG. 14 is a diagram showing an example of a control signal to be transmitted for each frame. Here, a description will be given taking a case where telecine information is superposed, as an example. In the case of a telecine picture, there exists a field which is outputted repeatedly. Conventionally, a field memory is provided at the receiving end, and whether a field has been repeated or not is detected by taking a difference between fields, and scanning conversion is carried out.

Figure 15:
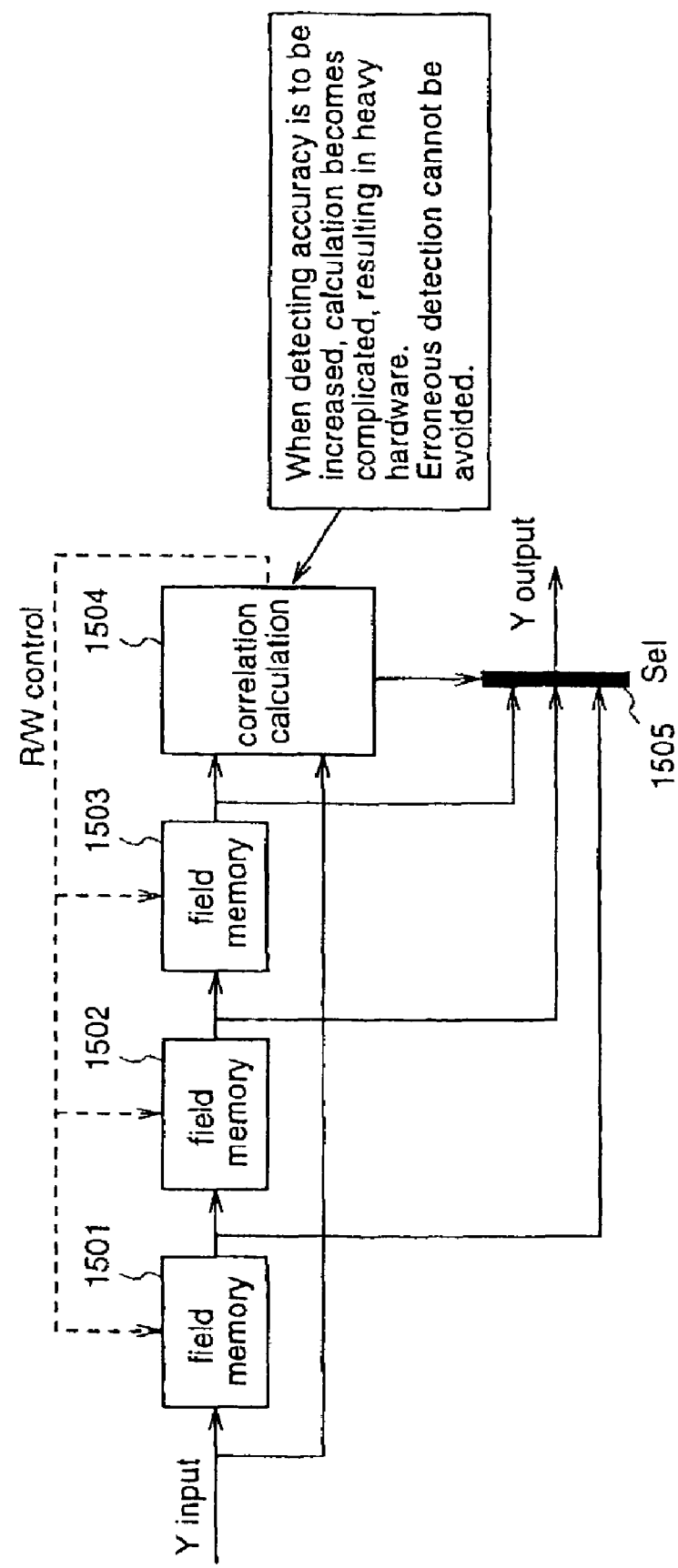
FIG. 15 is a conventional block diagram illustrating a conversion circuit when converting a telecine material from 24$p$ into for example 60$p$.

FIG. 15 is a block diagram illustrating a conversion circuit for converting a telecine material from 24p into 60p, for example. In FIG. 15, numerals 1501, 1502, and 1503 denote field memories, and each field memory delays an input by one field and outputs it. A correlation calculation means 1504 examines correlation between a signal that is delayed by these filed memories and then inputted and the present signal, for each pixel. When there is correlation, the correlation calculation means 1504 judges that the present field has been repeated, and operates to control a selecting means 1505 which selects a field memory the output of which is to be outputted, from among the field memories. In the conventional field repeat detecting means, when the detecting accuracy is to be increased, the calculation of correlation becomes complicated, resulting in heavy hardware. Further, in the case where quite similar patterns are processed, erroneous detection cannot be avoided.

Figure 16:
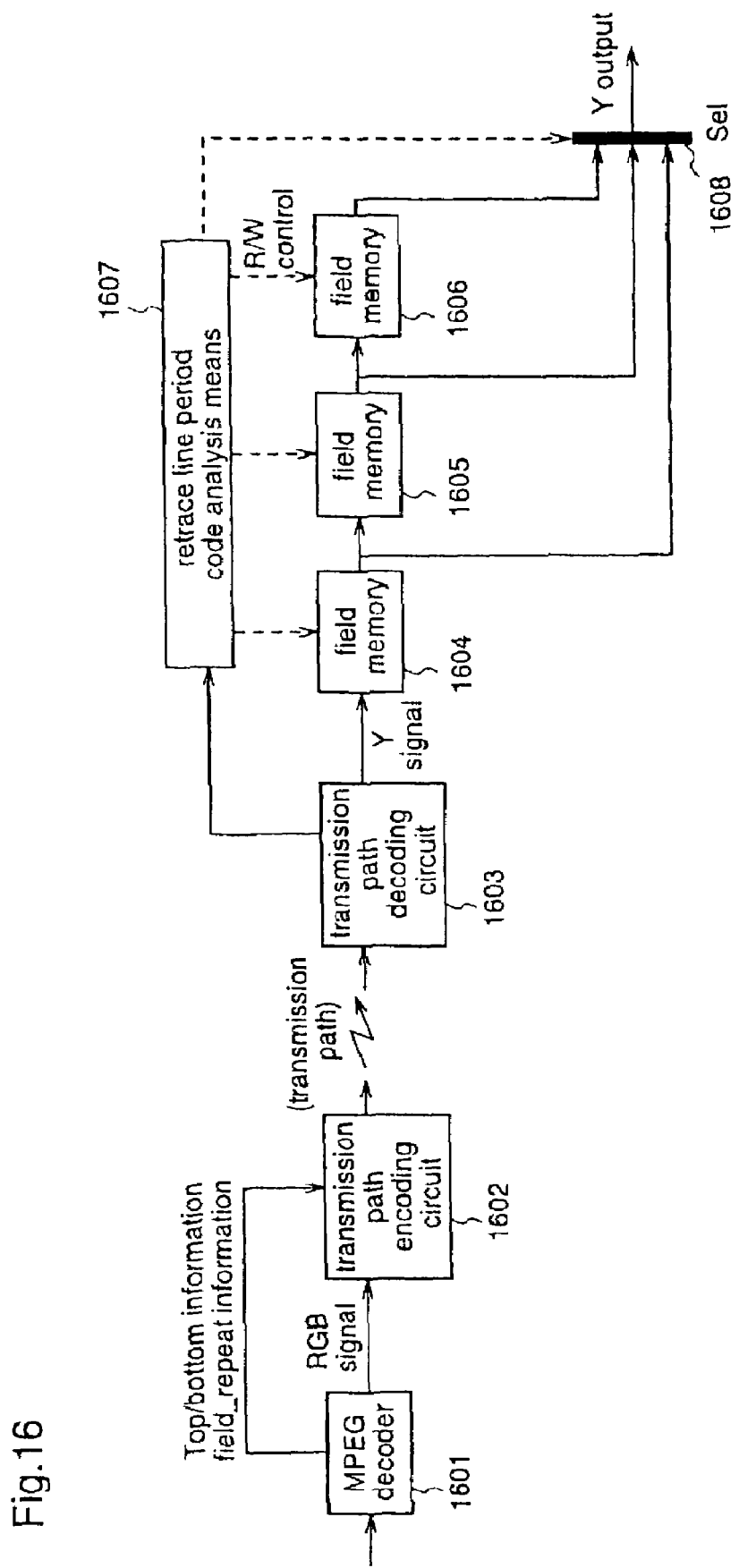
FIG. 16 is a diagram illustrating a field repeat signal transmission system in the fourth embodiment.
Figure 17:
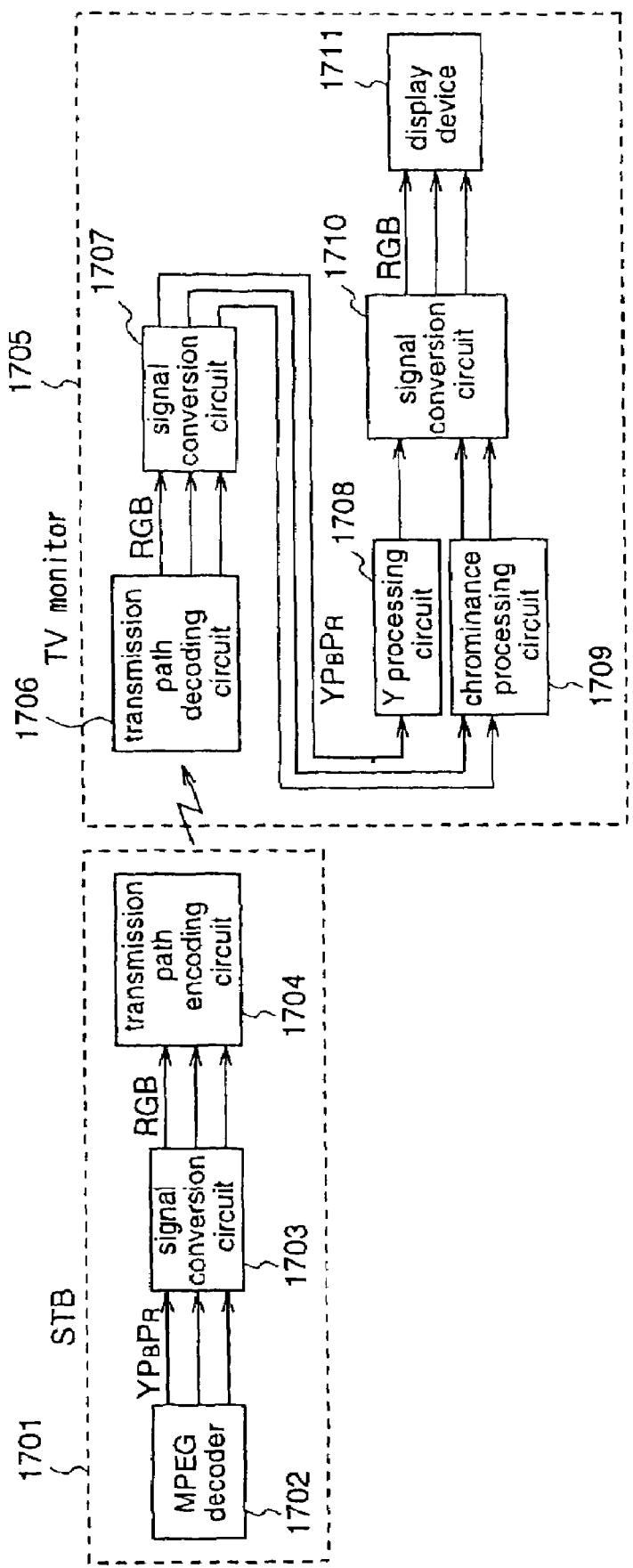
FIG. 17 is a block diagram illustrating the configuration of a conventional signal transmission system.

To solve the above-described problems, in this embodiment a field repeat signal transmission system is employed as shown in FIG. 16.

In FIG. 16, numeral 1601 denotes a MPEG decoder which decodes a broadcast wave and outputs a baseband video signal, and this MPEG decoder also outputs information as to whether a frame included in a stream of the broadcast wave is a top filed or a bottom field, and information as to whether a field has been repeated or not. Numeral 1602 denotes a transmission path encoding circuit, which encodes RGB signals outputted from the MPEG decoder 1601 into signals in the forms suited to the transmission path, and outputs the encoded signals during a scanning period, while superposes the top/bottom information and the field repeat information according to the form of the above-described control data during a retrace period. Numeral 1603 denotes a transmission path decoding circuit, which decodes the signals received through the transmission path into the original RGB signals, subjects the RGB signals to matrix conversion into Y color-difference signals, and outputs the Y color-difference signals. Numerals 1604, 1605, and 1606 denote field memories, and each field memory delays a video signal by a field. Numeral 1607 denotes a retrace period code analysis means which extracts the information superposed on the control data. Numeral 1608 denotes a selecting means which receives output from the control period code analysis means 1607 and selects a field memory whose output is to be outputted.

By the above-described configuration, the retrace period code analysis means 1608 can reproduce, without errors, the top/bottom information and the field repeat information which have been superposed at the transmitting end, and therefore, a Y output signal can be obtained by employing the correct field repeat information and top/bottom information.

Next, a description will be given of an output picture when conversion from 24*p* into 60*p* is performed on the monitor TV side employing these means and the picture is outputted, with reference to FIG. 14. In FIG. 14, numeral A1 denotes a first field of frame A, and numeral A2 denotes a second field of the same frame A. A TV monitor input signal is supposed to be a signal for example in which the A1 is followed by the A2 and then the field-repeated A1 comes again, temporally. In that case, a TV monitor output signal is a signal in which a frame composed of the A1 and the A2 is outputted and another frame composed of the A1 and the A2 similarly is outputted next. Here, when it is correctly detected that the third field of the input signal to the monitor is the same A1 as the first field, a correct picture composed of the A1 and the A2 is configured for the third frame of the TV monitor output signal. However, when there is erroneous detection at this time, the picture is not reproduced correctly. In this configuration as shown in FIG. 16, judgement is made on whether a field is repeated or not according to the top/bottom information and the field repeat information of the MPEG stream information superposed at the broadcasting end, whereby the output signal to the TV monitor is reproduced correctly.

Further, in the fourth embodiment, the description has been given of the case where the field repeat information and the top/bottom information as the information relating to the telecine is superposed, for example information as to whether the frame is I picture, P picture, or B picture, may be similarly superposed. The I picture is an intra-frame encoded picture, the P picture is a picture that employs a difference between frames, and the B picture is a picture encoded by employing a bidirectional difference. Thereby, parameter setting for noise elimination can be performed for each frame. Conventionally, it is riot known that each frame of a baseband video signal is the I picture, the B picture, or the P picture, whereby noise elimination cannot be performed adaptively.

Further, as another example, information relating to the compression ratio of the MPEG may also be superposed. In this case, as for the compression ratio of the MPEG, a video stream of some megabits per second can be obtained from a header of an elementary stream of the MPEG. Further, horizontal/vertical sizes as well as a frame rate can be also obtained. Therefore, by notifying the TV side of a relationship between the horizontal/vertical sizes as well as the frame rate and a bit rate, a parameter for noise elimination can be set. In this way, it can be avoided that an appropriate processing cannot be performed since information relating to the compression ratio of the MGEG is not known to the transmitting end, as conventional.

As another example, information as to whether a material is imaged by a progressive camera or an interlacing camera can be also known from the header of the MPEG stream, and thus this information can be transmitted as similar control data. This data can be utilized for selection of an IP conversion method, that is, a method of conversion from interlacing into progressive, on the TV monitor side Conventionally, a motion detection circuit is required to perform correct IP conversion and this motion detection circuit is employed to perform progressive interpolation in a static area, while to perform interlacing interpolation in a moving image area. However, this motion detection circuit is not required here. Further, even when a material is interlacing, or when a graphics layer such as an OSD is superimposed on most of the screen, the progressive interpolation is appropriate. Whether the OSD or the like is superimposed or not is known inside the STB, and when the OSD or the like is superimposed, a control signal is subjected to the progressive interpolation and transmitted, thereby performing correct interpolation.

Further, in data transmission in the signal transmission system according to the fourth embodiment, data with low transmission rate may be transmitted through the I²C bus shown in FIG. 4.

Further, in the second embodiment, the color difference signals are multiplexed into a single signal, whereby the whole video signals can be transmitted through two transmission paths, while three signal lines are required in the first embodiment, and therefore a signal for discriminating a natural picture outputted from the MPEG decoder and an OSD area can be transmitted through the remaining signal line. By transmitting this signal, even when an error in IP conversion occurs during broadcasting of 480p, the broadcasting of the 480p data is not adversely affected and display with high picture quality is possible. Further, characters and natural pictures can be processed separately for each pixel.

Further, in the second embodiment, only two transmission paths are required, whereby the remaining transmission path can be defined as a user-defined signal line.

Further, the description has been given of the case where a unit which outputs the video signal is the STB in FIG. 4, just the same configuration can be applied to a case where the unit is a digital camera or a notebook computer which requires power saving. In the case of a mobile terminal such as a digital camera or a notebook computer, a static picture is transmitted, and thus when a memory is held in the video input interface 408 on the TV monitor side or for example in the picture quality control part 1305 in the TV monitor body, presence or absence of the memory and capacity of the memory are first confirmed by 11C bus control or control employing the CTL0 or the CTL1, then a controlling side (mobile terminal side) instructs the TV monitor side of storage into the memory, and the controlling side (mobile terminal side) transmits a picture or pictures in the number within the memory capacity of the TV monitor side to the TV monitor side through the video output interface 403 at the instruction of a user The TV monitor side stores a video image set by the user in the video input interface 408 on the TV monitor side or for example in the picture quality control part 1305 in the-TV monitor body. When the TV monitor side is found not to have a memory by the confirmation of the presence or absence of the memory in the first step, a video signal is always outputted as well as a motion picture. Further, in the case of a PC, the same control is performed every time a video image inside is changed, and thus static data is transmitted in the above-described sequence when a change occurs in the video image of the PC. By this construction, a static image held on the TV monitor side can be continuously displayed on the TV monitor side without re-transmitting the same static picture continuously from the mobile terminal such as a digital camera or a notebook computer. Therefore, the video output interface in the digital camera as a video signal generating end is required to operate only when transmitting a static picture, resulting in power saving. By temporally repeating this static picture transmission, for example by repeatedly transmitting a static picture and stopping the transmission every second, a picture such as a motion JPEG can be efficiently transmitted with saved power.

APPLICABILITY IN INDUSTRY

A signal transmission system according to the present invention is available as a signal transmission system which has its configuration simplified and is capable of controlling a signal receiving unit from a signal transmission unit.

The invention claimed is:

1. A transmission apparatus for transmitting a video signal through a transmission path, comprising:
  a decoder to decode a compressively coded signal to output picture signals, including a base-band luminous signal and base-band color different signals, and a control signal which is generated based on the compressively coded signal;
  an encoder to time-divisionally multiplex the picture signals in a video period and the control signal in a retrace period, thereby to encode the picture signals and the control signal into transmission path signals suited to the transmission path;
  an I2C controller to control an I2C (Inter IC control) signal sent to the transmission apparatus from a reception apparatus; and
  a CPU to control the 12C controller and the decoder;
  wherein the decoder is controlled by the CPU so as to output the picture signals which are displayable in reception apparatus, on the basis of reception apparatus information included in the I2C signal that is received from the reception apparatus.

2. The transmission apparatus according to claim 1, wherein the control signal is information indicating at least one of (1) a picture of the picture signals is any of an I picture, a P picture, and a B picture, (2) a picture of the picture signals is either a picture picked up by progressive scanning or a picture picked up by interlaced scanning, (3) a picture of the picture signals is either a top field or a bottom field picture, (4) a compression ratio of MPEG, and (5) field repeat information of a picture of the picture signals.

3. The transmission apparatus of claim 1, wherein said transmission apparatus is provided by a transmission apparatus set top box (STB).

4. The transmission apparatus of claim 1, wherein said transmission apparatus is adapted so that any one of a plurality of different types of television monitors can be connected to said transmission apparatus.

5. A reception apparatus for receiving a video signal through a transmission path, comprising:
  a decoder to decode transmission path signal into picture signals, including a base-band luminous signal and base-band color different signals, and a control signal, the transmission path signal is generated by coding the control signal which is generated based on a compressively coded signal, and the video signal so as to be suited to the transmission path, the control signal is time-division-multiplexed in a retrace period;
  a ROM table to hold reception apparatus information indicating performance for making the picture signals displayable;
  an I2C controller to output the reception apparatus information stored in the ROM table to a transmission apparatus on the basis of an I2C (Inter IC control) signal outputted from the transmission apparatus
  wherein the reception apparatus information is used by the transmission apparatus to output pictures signals which are displayable by the reception apparatus.

6. The reception apparatus according to claim 5, wherein the control signal is information indicating at least one of (1) a picture of the picture signals is any of an I picture, a P picture, and a B picture, (2) a picture of the picture signals is either a picture picked up by progressive scanning or a picture picked up by interlaced scanning, (3) a picture of the picture signals is either a top field or a bottom field picture, (4) a compression ratio of MPEG, and (5) field repeat information of a picture of the picture signals.

7. The reception apparatus according to claim 5, wherein the control signal is used for controlling image quality.

8. A reception apparatus for receiving a video signal through a transmission path, comprising:
  a decoder to decode transmission path signal into picture signals, including a base-band luminous signal and base-band color different signals, and a control signal, the transmission path signal is generated by coding the control signal which is generated based on a compressively coded signal, and the video signal so as to be suited to the transmission path, the control signal is time-division-multiplexed in a retrace period;
  a ROM table to hold reception apparatus information indicating performance for making the picture signals displayable;
  an I2C controller to output the reception apparatus information stored in the ROM table to a transmission apparatus on the basis of an I2C (Inter IC control) signal outputted from the transmission apparatus;
  wherein the reception apparatus information is used by the transmission apparatus to output pictures signals which are displayable by the reception apparatus; and
  an image quality controller to control the image qualities of the picture signals on the basis of the control signal.

9. A transmission apparatus which receives a compressively coded signal from a broadcast station for transmitting a video signal to a reception apparatus through a transmission path, comprising:
  a decoder to decode a compressively coded signal to output picture signals, including a base band luminous signal and base band color different signals, and a control signal which is generated based on the compressively coded signal;
  a transmission path encoding circuit for time-division-multiplexing the picture signals in a video period and the control signal in a retrace period, said control signal including information for use in controlling image quality of the picture signals;
  an I2C controller to control an I2C (Inter IC control) signal sent to the transmission apparatus from a reception apparatus; and
  a CPU to control the I2C controller and the decoder;
  wherein the decoder is controlled by the CPU so as to output the picture signals which are displayable in reception apparatus, on the basis of reception apparatus information included in the I2C signal that is received from the reception apparatus.

10. The transmission apparatus according to claim 9, wherein the control signal is information indicating at least one of (1) a picture of the picture signals is any of an I picture, a P picture, and a B picture, (2) a picture of the picture signals is either a picture picked up by progressive scanning or a picture picked up by interlaced scanning, (3) a picture of the picture signals is either a top field or a bottom field picture, (4) a compression ratio of MPEG, and (5) field repeat information of a picture of the picture signals.

11. The transmission apparatus of claim 9, wherein said transmission apparatus is provided by a transmission apparatus set top box (STB).

12. The transmission apparatus of claim 9, wherein said transmission apparatus is a digital camera.

13. The transmission apparatus of claim 9, wherein said transmission apparatus is a notebook computer.

14. The transmission apparatus of claim 9, wherein said transmission apparatus is adapted so that any one of a plurality of different types of television monitors can be connected to said transmission apparatus.

* * * * *

UNITED STATES PATENT AND TRADEMARK OFFICE
CERTIFICATE OF CORRECTION

| | |
|---|---|
| PATENT NO. | : 7,394,854 B2 |
| APPLICATION NO. | : 10/088468 |
| DATED | : July 1, 2008 |
| INVENTOR(S) | : Toshiro Nishio et al. |

Page 1 of 1

It is certified that error appears in the above-identified patent and that said Letters Patent is hereby corrected as shown below:

Column 15, line 40 change "the 12C" to --I2C--.

Column 15, line 43 change "reception apparatus," to --the reception apparatus--.

Column 17, line 1 change "reception apparatus," to --the reception apparatus,--.

Signed and Sealed this

Twenty-fourth Day of March, 2009

JOHN DOLL
*Acting Director of the United States Patent and Trademark Office*